US005688370A

United States Patent [19]
Hagen et al.

[11] Patent Number: 5,688,370
[45] Date of Patent: Nov. 18, 1997

[54] SHEET MATERIALS FOR SOLID PHASE EXTRACTIONS AND SOLID PHASE REACTIONS

[75] Inventors: Donald F. Hagen; Simon S. Fung, both of Woodbury; Paul E. Hansen, Lake Elmo, all of Minn.

[73] Assignee: Minnesota Mining and Manufacturing Company, St. Paul, Minn.

[21] Appl. No.: 428,571

[22] Filed: Apr. 25, 1995

Related U.S. Application Data

[62] Division of Ser. No. 172,042, Dec. 22, 1993, abandoned.

[51] Int. Cl.$^6$ ................................ D21H 13/26
[52] U.S. Cl. .......... 162/146; 162/157.3; 162/164.2; 162/181.1; 162/181.6; 210/505; 210/508
[58] Field of Search ............... 162/146, 157.3, 162/157.5, 181.6, 181.1, 164.2; 210/505, 508

[56] References Cited

U.S. PATENT DOCUMENTS

| | | | |
|---|---|---|---|
| 2,955,067 | 10/1960 | McBurney et al. | 162/164.2 |
| 2,999,788 | 9/1961 | Morgan | 162/146 |
| 3,266,973 | 8/1966 | Crowley | 162/164.2 |
| 3,414,645 | 12/1968 | Morgan, Jr. | 264/210 |
| 3,573,158 | 3/1971 | Pall et al. | 162/131 |
| 3,671,542 | 6/1972 | Kwolek | 260/30.8 R |
| 3,739,913 | 6/1973 | Bogosian | 210/924 |
| 3,756,908 | 9/1973 | Gross | 162/146 |
| 3,869,429 | 3/1975 | Blades | 260/78 S |
| 4,366,068 | 12/1982 | Ostreicher et al. | 210/767 |
| 4,384,957 | 5/1983 | Crowder, III et al. | 210/656 |
| 4,395,332 | 7/1983 | Klein | 210/496 |
| 4,505,823 | 3/1985 | Klein | 210/668 |
| 4,512,897 | 4/1985 | Crowder, III et al. | 210/656 |
| 4,524,103 | 6/1985 | Seager | 428/338 |
| 4,529,663 | 7/1985 | Lancaster et al. | 428/450 |
| 4,540,625 | 9/1985 | Sherwood | 428/283 |
| 4,608,089 | 8/1986 | Gale et al. | 106/90 |
| 4,608,361 | 8/1986 | Kanamori et al. | 502/232 |
| 4,647,497 | 3/1987 | Weeks | 428/284 |
| 4,698,267 | 10/1987 | Tokarsky | 428/474.4 |
| 4,737,394 | 4/1988 | Zafiroglu | 428/102 |
| 4,765,915 | 8/1988 | Diehl | 210/505 |
| 4,780,180 | 10/1988 | Take et al. | 162/145 |
| 4,810,381 | 3/1989 | Hagen et al. | 210/502.1 |
| 4,818,340 | 4/1989 | Hasegawa et al. | 162/146 |
| 4,941,947 | 7/1990 | Guckert et al. | 162/103 |
| 4,943,375 | 7/1990 | Bradshaw et al. | 210/674 |
| 4,985,046 | 1/1991 | Hartzler | 8/654 |
| 4,992,141 | 2/1991 | Sullivan | 162/146 |
| 5,026,456 | 6/1991 | Hesler et al. | 162/146 |
| 5,108,617 | 4/1992 | Eriksson et al. | 210/679 |
| 5,124,041 | 6/1992 | Sheer et al. | 210/641 |
| 5,223,139 | 6/1993 | Ruger et al. | 210/505 |
| 5,227,072 | 7/1993 | Brinkley | 210/671 |
| 5,279,742 | 1/1994 | Markell et al. | 210/638 |
| 5,288,402 | 2/1994 | Yoshida | 210/488 |
| 5,328,758 | 7/1994 | Markell et al. | 428/281 |
| 5,340,746 | 8/1994 | Hagen et al. | 436/109 |
| 5,415,779 | 5/1995 | Markell et al. | 210/635 |

FOREIGN PATENT DOCUMENTS

| | | |
|---|---|---|
| 0 498 557 | 8/1992 | European Pat. Off. . |
| 63-232814 | 3/1987 | Japan . |
| HEI 3-119200 | 5/1991 | Japan . |
| 911820 | 11/1962 | United Kingdom ............ 162/164.2 |
| WOA9301494 | 1/1993 | WIPO . |
| WOA9306924 | 4/1993 | WIPO . |

OTHER PUBLICATIONS

Donald F. Hagen et al., "Membrane Approach to Solid Phase Extractions," Analytica Chimica Acta, 236, 157–164 (1990).
Craig G. Markell, et al., "New Technologies in Solid–Phase Extraction," LC/GC, 9:5, 332–337 (1991).
"Radiation Effects on Polymers", ACS Symposium Series 475, American Chemical Society, Washington, DC 1991, Chapter 15 (pp. 251–261).
Chem Abstract No. 110:156648t.

*Primary Examiner*—Peter Chin
*Attorney, Agent, or Firm*—Lorraine R. Sherman

[57] ABSTRACT

A sheet article for solid phase extraction or solid phase reaction has at least one sorptive polymer pulp at least one of sorptive and reactive particulate. The article can be used in a method of separating an analyte from a fluid by passing a fluid containing an analyte through a sheet article containing poly(p- or m-phenylenephthalamide) pulp and solid phase particles.

26 Claims, No Drawings

5,688,370

SHEET MATERIALS FOR SOLID PHASE EXTRACTIONS AND SOLID PHASE REACTIONS

This is a division of application Ser. No. 08/172,042 filed Dec. 22, 1993 now abandoned.

FIELD OF THE INVENTION

This invention relates to sheet materials useful in separation science, e.g., for solid phase extraction (SPE) and solid phase reaction (SPR) processes. In another aspect, there are disclosed methods of making and using the unitary and composite materials of the invention.

BACKGROUND OF THE INVENTION

Solid Phase Extraction (SPE) processes use specific solid particles which interact by ion exchange, chelation, covalent bond formation, size exclusion or sorptive mechanisms to bind and remove molecules and/or ions from fluids, such as water or air, in which they are dissolved. The ions or molecules can be eluted subsequently from the solid particles for purposes of quantitative or qualitative determination, or in some cases for concentration or disposal.

Solid Phase Reaction (SPR) processes, similarly, use specific, reactive solid particles as reactants toward molecules or ions dissolved in fluids such as air or water. The dissolved molecules or ions are transformed by chemical reaction with the reactive solid particles to provide reaction product(s) which may be collected, analyzed, etc.

The use of membranes or sheet material for SPE processes was described in *Analytica Chimica Acta*, 236, 157–164 (1990), wherein fluids containing analytes were brought into contact with sorbent particles entrapped in an inert poly(tetrafluoroethylene) (PTFE) fibril matrix. The method was also described in *LC/GC*, 9:5, 332–337 (1991). Small, high surface area particles of the method are shown to provide a kinetic advantage over particle packed columns or cartridges.

U.S. Pat. No. 4,810,381 describes a chromatographic sheet material comprising PTFE fibrils having entrapped therein sorptive particulate. The PTFE fibrils are formed in situ from a PTFE dispersion during the process of entrapping the sorptive particulate as the sheet material is being formed.

Numerous natural fibers in the form of pulps, such as cellulose pulp, are converted into sheet material by classical paper-making methods generally known as "wet laid" processing. The general procedure for making paper from aqueous-based natural pulp, for example cellulose, is of course ancient. Such sheet materials are known in the art as useful substrates for paper chromatography. Cellulosic sheets are generally useful only for separation of hydrophilic compounds.

Paper-like sheet materials have been prepared from synthetic polymers as disclosed in U.S. Pat. No. 2,999,788.

U.S. Pat. No. 4,529,663 teaches a sheet material for gaskets comprising clay, calcium silicate, cellulose fibers, organic polymer binder, and fibrillated poly(aromatic amide). U.S. Pat. No. 4,608,089 describes improved cement matrix composites comprising polyethylene fibrids, cellulose pulp, and Portland cement.

U.S. Pat. No. 4,737,394 teaches an oil-adsorbing fibrous article comprising polyethylene or polypropylene that is stitch-bonded with an elastic thread such as Spandex™ elastomeric yarn.

U.S. Pat. Nos. 4,384,957 and 4,512,897 describe a molecular separation column for use in high pressure liquid chromatography (HPLC) comprising a container and a plurality of porous wet-laid matrix of fibers having particulate immobilized therein. It defines the term "column" as "any container, usually but not necessarily cylindrical in shape, having a total depth of at least one centimeter and preferably greater than two centimeters."

U.S. Pat. No. 5,026,456 (Hesler, et al., Dupont) describes high porosity aramid (i.e., aromatic polyamide, usually meaning poly(p-phenylene terephthalamide and/or poly(m-phenylene isophthalamide)) papers comprising pulp from both fresh fibers and previously-dried (i.e., used or recycled) fibers. The papers are said to have greater porosity than those prepared only from fresh fiber pulp.

Japan Kokai Patent Application 63 232,814 (two abstracts) (Daicel Chemical Industries) describes filter papers for microfiltration of liquids comprising either two different lengths of Kevlar™ fiber or a mixture of Kevlar™ and cellulose fibers which is reported to be useful for physical filtration of microparticles from aqueous suspensions. Solid phase extraction processes are not disclosed.

Japanese Patent Kokai HEI3[1991]-119200 discloses a porous glass paper made from a mixture of glass fibers and fibrillated heat resistant organic fibers, such as aromatic polyamide fibers. The porous glass paper is used as an element in an air cleaner.

"Radiation Effects on Polymers", ACS Symposium Series 475, American Chemical Society, Washington, D.C. 1991, Chapter 15 (pp 251–261) relates to electron-beam curing of aramid-fiber reinforced composites. The reference discusses aramid fibers, specifically poly(p-phenyleneterephthalamide), Kevlar™, which has radiation stabiliity as a consequence of its highly aromatic structure.

SUMMARY OF THE INVENTION

Briefly, the present invention provides a sheet article (also called sheet material) for at least one of solid phase extraction and solid phase reaction, comprising at least one sorptive polymer pulp, wherein the polymer is hydrophilic and substantially non-swellable, and exhibits a water contact angle of at most 30 degrees (as measured on a Goniometer, Gaertner Scientific Corp., Chicago, Ill.). In a preferred embodiment, the invention relates to sheet articles wherein the polymer pulp is comprised of derivatives (i.e., chemical alterations) of poly(p- or m-phenyleneterephthalamide), more preferably methylated poly(p-phenyleneterephthalamide). By derivatives is meant reaction of a pulp material, e.g., a carbonyl or amide group thereon, with a chemically reactive species, for example LiAlH$_4$, boron trifluoride, diazomethane, acetyl chloride, and the like. The sheet materials of the invention are useful in separations and as a reactive media. The sorbed contaminant can become physically bound to the polymer pulp of the sheet material.

In another aspect, the present invention relates to the above-described sheet material further comprising at least one of sorptive and reactive particulates.

In a further aspect, the present invention relates to a method of using, recovering, repulping, and reusing the sheet material of the invention.

In a still further aspect, a method of separating metallic ions, preferably radioactive metallic ions, from solution is disclosed. Metal ions can bind with particulate enmeshed in the sheet material of the invention and can be removed from solution.

It is believed to be novel in the art that fibrous composite sheet materials, prepared by "wet-laid" processes from synthetic polymer pulps, optionally comprising small, kinetically efficient sorptive or chemically reactive particulates, are useful in separation science, preferably for solid phase extraction and solid phase reaction processes. It is surprising that fibrous sheet materials prepared from certain synthetic moderately hydrophilic polymers, preferably poly (p-phenylenephthalamide), sold under the trade name Kevlar™ (Dupont), are useful in solid phase extraction processes to bind contaminants in solution even in the absence of enmeshed particulate materials.

In this application:

"basis weight" is the weight of particulate or filler material per unit area of sheet material;

"hydrophilic" means having a relatively high surface polarity, for example, in the range of 0.5 to 0.8, and has a high adsorptive capacity for water, e.g., has a moisture regain at 50% relative humidity of at least 5–6 weight percent of total weight;

"hydrophobic" means having a low surface polarity, for example, in the range of 0.1 to less than 0.5;

"normal phase system" means a process using a more polar stationary phase with a less polar moving phase to effect separation of molecular species;

"particle" or "particulate" means a regular or irregularly shaped particle having an average size (largest diameter) in the range of 0.1 to 100 micrometers, preferably in the range of 1 to 30 micrometers, and more preferably in the range of 5 to 20 micrometers;

"polymer pulp" means fibrid particles which are usually frazzled, i.e., in a frayed or tattered condition, having a high specific surface area, and a high adsorptive capacity for water;

"reactive" means capable of entering into a chemical reaction;

"reversed phase system" means a process using a less polar stationary phase with a more polar moving phase to effect separation of molecular species;

"solid phase extraction" (SPE) means a process employing a solid phase for isolating classes of molecular species from fluid phases such as gases and liquids by sorptive, ion exchange, chelation, size exclusion (molecular filtration), affinity, ion-pairing, etc., mechanisms;

"solid phase reaction" (SPR) means a process employing a reactive solid phase for performing chemical transformations such as oxidation, reduction, esterification, etc., reactions on certain molecular species in a fluid phase;

"sorptive" or "sorption" or "sorbent" means capable of taking up and holding by either absorption or adsorption;

"substantially non-swellable" means having a change in volume of less than 0.5, preferably less than 0.1, most preferably less than 0.01, wherein the change in volume is calculated by the formula $$\text{change} = (V_g - V_o)/V_o$$

wherein $V_g$ is the volume of the particulate when swollen, and $V_o$ is the volume of the dry particulate; and "thermal desorption" means a process for thermally recovering volatile compounds sorbed on a solid stationary phase without the use of eluting solvents.

In contrast to the teachings of prior art, it has been found that a unitary sheet comprising one or more fibrous pulps, and composite sheet materials comprising small, kinetically efficient sorptive or chemically reactive particles enmeshed with at least one synthetic polymer pulp can be prepared in fibrous sheet form using a "wet laid" or "paper making" process, which sheets are useful in providing a desirable medium for at least one of solid phase extractions and reactions for analytical and process applications. It has been found that blends or mixtures of various pulps and active particulate are especially useful to optimize the composite articles with regard to controlling properties such as adsorptivity, reactivity, controlled hydrophobicity/hydrophilicity, hydrolytic stability, porosity, thermal stability, radiation stability, and moldability. The sheet material of the invention can contain glass fibers, but preferably, the sheet materials of the invention are free of glass fibers.

DETAILED DESCRIPTION OF THE INVENTION

The sheet article of the present invention can be a unitary sheet comprising a single sorptive fibrous pulp or a blend of fibrous pulps, or a composite sheet material with sorptive or reactive particles enmeshed therein. The moderately hydrophilic fibrous pulps can comprise main fibers surrounded by many smaller attached fibrils, resulting in a high surface area material. The main fiber generally can have a length in the range of 0.8 mm to 4.0 mm, and an average diameter in the range of less than 1 to 20 micrometers, preferably less than 1 to 12 micrometers.

Suitable moderately hydrophilic pulps for providing the sheet materials of the present invention include: aramid pulps, preferably poly(p-phenylenephthalamide) (Kevlar™, Dupont), and polyacrylonitrile (PAN). Blends with hydrophobic polyolefin pulps, such as at least one of polypropylene and polyethylene, can be used to optimize the physical and sorptive properties of the sheet materials. Ratios of moderately hydrophilic pulps to hydrophobic pulps can be 1 to 100 weight percent to 0 to 99 weight percent, preferably 10 to 90 weight percent to 90 to 10 weight percent.

Particulate that can be incorporated in the sheet materials of the present invention include particles which interact by ion exchange, chelation, covalent bond formation, size exclusion or sorption mechanisms to bind and remove molecules and/or ions from fluids such as water or air, in which they are dissolved or entrained. Particulate which undergo chemical reactions including oxidation-reductions are a particularly useful class. Representative examples include inorganic oxides such as silica, alumina, and zirconia, and derivatives thereof, particularly coated derivatives such as polymeric coatings and coatings that are covalently bonded such as $C_{18}$-derivatized silica, and silica bonded with a macrocyclic ligand, as disclosed for example in U.S. Pat. No. 4,943,375 (Brigham Young University, Provo, Utah), preferably crown ether bonded silica, most preferably macrocycle 18-crown-6-bonded silica. Other useful particulate include polymeric organic resins, such as styrene divinylbenzene and derivatives thereof. The particulate can have ion exchange, chelation, or chiral separation properties. Hydrophobic zeolites such as Silicalite™ (UOP, Tarrytown, N.Y.) are particularly useful in a Kevlar sheet for isolating volatile organic compounds since both components are high temperature stable. Carbon can be useful as a sorptive particulate in certain applications. Hydrophobic molecular sieves can be useful to sorb organic materials such as pollutants. Alumina coated with elemental gold is a useful reactive particulate in certain oxidation-reduction reactions, and to isolate elemental mercury by amalgam formation with elemental gold.

Particles useful in the present invention preferably have an average size in the range of 0.1 to 100 micrometers, preferably in the range of 1 to 30 micrometers, and more preferably 5 to 20 micrometers. It has been found that a particle size distribution that has a bimodal shape (two different particle size ranges) can provide higher particulate loadings for more efficient SPE applications.

Particulate can be present in the range of 0 to 80 weight percent, preferably 10 to 45 weight percent, most preferably 20 to 40 weight percent, based on the total weight of the sheet material.

Sheet materials are prepared by dispersing the polymer pulp(s) with or without particulate, preferably using a blender, in the presence of a suitable liquid, preferably water, or water-miscible organic solvent such as alcohol or water-alcohol. The dispersion is poured through a fine screen preferably having pores of about 0.14 mm (100 mesh) to provide a wet sheet, which is then pressed to remove additional liquid. The sheet is then dried, preferably by heating, to provide a dry sheet having an average thickness in the range of about 0.1 mm to less than 10 mm, preferably 0.2 mm to 9 mm, more preferably 0.2 mm to 8 mm, most preferably 0.3 mm to 5 mm, and even more preferably 0.4 to 3 mm, and a Gurley porosity, defined below, of at least 0.1 seconds. Up to 100 percent of the liquid can be removed, preferably up to 90 percent. Calendering can be used to provide additional pressing or fusing, when desired. The sheet resembles porous, unglazed paper that may have color, depending upon its components.

Sheet materials comprising Kevlar are particularly useful when radiolytic, hydrolytic, thermal, and chemical stability are desired. In most cases, such materials will exhibit resistance to swelling when exposed to solvents. Advantageously, Kevlar pulp can be blended with polyolefin pulp to provide a moldable or partially thermally fusible fiber to improve physical properties of the sheet material. In a preferred embodiment, the outer edges of a Kevlar blend disk were thermally fused under pressure to prevent edge wicking. Thermal fusing of a Kevlar blend disk in various patterns can be useful for specific applications. Sheet materials comprising Kevlar are particularly useful for removal of radioactive species from fluids because of their resistance to deterioration under the influence of radiation from radioactive decay. For example, radioactive metal ions such as of strontium (Sr) and cesium (Cs) can be bound in composite sheet materials comprising Kevlar and certain crown ether-bonded silica particles.

The sheet materials of the present invention comprising sorptive polymer pulp and optionally sorptive or reactive particulate, have controlled porosity (i.e., are uniformly porous), and preferably have a Gurley time of at least 0.1 sec., preferably at least 2–4 seconds, and more preferably at least 4 secs. The basis weight of the sheet materials can be in the range of 50 to 5000 g/m², preferably in the range of 100 to 1000 g/m², most preferably 150 to 400 g/m².

Desirably, the average pore size of the uniformly porous sheet material can be in the range of 0.1 to 10 micrometers. Void volumes in the range of 20 to 80% can be useful, preferably 40 to 60%. Porosity of the sheet materials can be modified (increased) by including adjuvant hydrophilic or hydrophobic fibers, such as polypropylene or polyethylene fibers, of larger diameter or stiffness with the mixture to be blended. Fibers can have an average size of up to 20 micrometers, and up to an average length of 4 mm; preferably the adjuvant fibers added to control porosity are non-sorptive. Up to 99 weight percent of fibers can be adjuvants.

Other adjuvant fibers useful in the present invention include polytetrafluoroethylene (PTFE) which can be fibrillated in situ to assist in consolidating the pre-formed pulps. Polymer blended fibers are useful in non-particle loaded and in particle loaded sheet articles. Blends of Kevlar with PTFE are particularly useful.

In use, the sheet materials of the present invention, which can be supported on a sheet or scrim (i.e., a porous backing), are challenged with a fluid, which preferably is a liquid, comprising at least one analyte, generally a contaminant which can be a pesticide, dye, hydrophobic oil or grease, or a semi-polar phenolic, polynuclear aromatics, volatile organics (VOCs), or the like, to be isolated. It may be desirable to pre-wet the sheet material which can be in the form of a disk, pleated cartridge, etc., before passing the fluid through the sheet material. Vacuum or positive pressure can be used to accelerate the flow-through rate of the fluid.

Recovery of the removed analyte can be achieved by elution from the sheet material by use of an appropriate solvent, generally an alcohol such as methyl alcohol, to provide a concentrated form, as is known in the art, which is subsequently analyzed.

Unfused sheet materials of the present invention possess an additional desirable property in that the pulps and particules can be reused. After use of the sheet material for SPE or SPR and removal of all contaminants therefrom, the sheet material can be repulped by chopping and dispersing in a blender and repeating the other preparatory steps. The sheet material can then be used again for an SPE or SPR application. This can be particularly advantageous and cost-effective in applications involving remediation where large quantities of sheet material or expensive sorptive or reactive particulate have been used.

It is important to recognize the differences between an HPLC column, as disclosed in U.S. Pat. No. 4,512,897 disclosed above, and SPE technologies. HPLC columns are designed to perform in one operation a separation and analysis, with appropriate detectors, of individual analyte molecular species present in mixtures. Columns of sufficient length containing small particles of narrow size distribution must be employed to obtain efficient separation of individual molecular species present in the sample. These columns containing small particulate typically require high pressure pumps and apparatus to obtain eluant flow rates useful in the separation process. U.S. Pat. No. 4,512,897 teaches that a broad range of particle sizes can be utilized. It is known in the art that efficient columns require small particles with a narrow range of size distribution to obtain resolution of individual molecular species. SPE columns or sheet materials, on the other hand, are designed simply to isolate and concentrate classes of analytes for separate, subsequent analyses. Narrow distributions of particle size are not as important as with HPLC columns. SPE articles are designed for one step sorption and subsequent desorption as well as low pressure extraction and isolation of classes of compounds based on their chemical and physical properties. For example, many pollutants such as pesticides and polynuclear aromatics (PNAs) are considered toxic because their hydrophobicity enhances their tendency to accumulate in hydrophobic fatty tissue. One type of hydrophobic adsorptive particulate used to isolate hydrophobic analytes by SPE is silica to which octadecyl groups ($C_{18}H_{37}$, hereafter $C_{18}$) are covalently bonded. This particulate, when used in SPE particle packed columns or membranes, is effective for extracting hydrophobic molecules from various fluids such as air and water.

In contrast to prior art composite sheet materials comprising fibrillated PTFE as the matrix fibrous web, the present invention requires fibers which are preformed. Additionally, PTFE fibrils are inert material which is in contrast to the sorptive fibers of the present invention. PTFE fibrils may be present in the present invention sheet articles but they are in addition to preformed sorptive polymer pulp.

The sheet materials of the present invention are useful in analytical and remediation applications where removal of contaminants from fluids is desired. By appropriate choice of pulps and particulates removal by sorption or chemical reactions can be achieved. Desirable properties such as radiolytic stability and thermal stability may also be provided by use of Kevlar pulp in the sheet material. This allows for removal of radioactive contaminants, e.g., radioactive Sr or Cs ions, from fluids by use of the sheet materials of this invention. Silica-immobilized crown ethers as disclosed in U.S. Pat. No. 4,943,375 are particularly useful for this purpose.

TEST METHODS

Gurley Porosity

Air permeability testing was done using a densometer manufactured by W & L. E. Gurley Company, Troy, N.Y., model No. 4110 NY 5826. "Gurley times," "Gurley porosity," and liquid flow rates are direct functions of mean pore size. The test measures the time, in seconds, necessary for 50 cubic centimeters of air under pressure to pass through the article to be tested. Longer times indicate a less-permeable web and, thus, smaller voids through which the air passes.

In operation, a sample of the web to be tested having a circular cross-sectional area of approximately 645 mm$^2$ was maintained at approximately 23°–24° C. and 50 percent relative humidity, then subjected to passage of 50 cm$^3$ of air at 124 mm H$_2$O pressure in the above-described densometer. The densometer was calibrated and operated with a Gurley-Teledyne sensitivity meter (Cat. No. 4134/4135). The measurement was taken in a manner similar to a standard test of the Technical Association of the Pulp and Paper Industry, Atlanta, Ga., for measuring the air resistance of paper (TAPPI Official Test Method T 460 om-83, incorporated by reference herein).

Coulter Porosity

Pore sizes of the sheet materials of the invention were measured by a Coulter Porometer, Model PORO-2 (Coulter Electronics, Luton, England).

Disperse Red Dye I Test

Sorptive ability of the sheet materials of the invention was evaluated as follows:

A 47-mm diameter disk of the sheet material to be tested was placed on a standard Millipore™ vacuum filtration apparatus (manufactured by Millipore Corp., Bedford, Mass.), pre-wet with a few ml of methyl alcohol, washed with a few ml of water (being careful not to let the disk surface go dry after the addition of methyl alcohol), after which one liter of reagent grade water containing 100 ppb by weight of Disperse Red I dye (Aldrich Chemical Co.) was pulled through the disk using a 25.4 cm Hg vacuum, at a measured flow rate of 17.9 minutes per liter.

The dye was eluted from the disk with two 3-ml portions of methyl alcohol (MeOH) which were combined and made up to 10 ml total volume for spectrophotometric analysis. Results were reported as a percentage of dye in the original aqueous dye solution which is eluted from the disk. Recoveries of less than 100 percent occurred when (1) the analyte was not completely extracted by the sorptive disk or (2) the analyte was too strongly sorbed to be eluted by the solvent selected.

Thin Layer Chromatography (TLC) Test for SPE Applications

In order to evaluate the ability of synthetic papers of the invention to act as SPE media, a test strip measuring 2.54 cm×8.89 cm was cut from sheet material prepared as in Example 1 and spotted with a standard dye or dye mixture (i.e., mixture 30-03 or 30-04, Analtech, Newark, Del.). The test strip was developed using standard TLC practice (cf. Poole et al., "Contemporary Practice of Chromatography," Elsevier, N.Y., 1984) with solvents as noted, and both the distance moved by the mobile phase (solvent), $Z_f$, and the distance moved by the sample spot, $Z_s$, were measured. The Retardation Factor, $R_f$, was calculated by $R_f = Z_s/Z_f$. When $R_f = 0$, the sample spot had not moved from the origin, indicating that the dye was too tightly bound to the adsorbent stationary phase, and when $R_f = 1$, the sample spot had moved with the mobile phase, indicating that the adsorbent stationary phase was not effective in binding the dye species with the mobile phase employed.

Atrazine Retention

To test the absorptive properties of the inventive sheet materials toward a typical pesticide pollutant, sheet materials were challenged with a dilute aqueous solution of atrazine (6-chloro-N-ethyl-N'-(1-methylethyl)-1,3,5-triazine-2,4-diamine, available from Chem Service, Inc., Westchester, Pa.). A 47 mm disk cut from sheet material of the invention was placed in a standard Millipore™ vacuum filtration flask assembly. The disk was washed with 10 ml methylene chloride and 10 ml isopropyl alcohol, after which a 1 liter sample of water containing 0.15 parts per billion by weight of atrazine was pulled through the disk using a 25.4 cm (10-inch) (Hg) vacuum. Next, the sorbed atrazine was eluted from the disk with 3×5 ml aliquots of methyl alcohol and the alcohol eluants were collected and combined, then made up to exactly 25 ml for HPLC analysis using UV detection at 225 nm. Recovery was reported as a percent of total atrazine in the initial water solution.

Oil Extraction

To test the ability of the inventive sheet materials to extract and retain oil/grease/hydrophobic materials from water suspensions thereof, the following test was performed:

Aliquots of 20, 200, and 1000 microliters of oil from the following sources were added to 1 liter volumes of deionized water: (a) Pneumatic lubricating oil (PLO), Gast Manufacturing Corporation, Benton Harbor, Mich.; (b) Corn oil (CO), Hunt-Wesson Inc., Fullerton, Calif.; (c) Bacon grease (BG) from fried slab bacon obtained from Von Hansons Butchers, Apple Valley, Minn.

A 47 mm disk cut from sheet material of the invention was placed in a standard Millipore™ vacuum filtration flask assembly. The disk was washed with 10 ml methyl alcohol, after which a 1 liter sample of water spiked with oil (above) was pulled through the disk under 10 mm (Hg) vacuum. Air was then pulled through the disks for 10 minutes to remove entrapped water.

The oil sorbed by the disk was then eluted with 2×15 ml aliquots of cyclohexane to desorb the oil and the eluants containing the desorbed oils were collected and combined, then dried over anhydrous sodium sulfate. The cyclohexane was then filtered through a 0.45 micrometer PTFE filter, using 2×5 ml cyclohexane to rinse the sodium sulfate. Cyclohexane was then evaporated under a stream of dry nitrogen until a constant weight was obtained. The percent recovery of the original oil sample was recorded.

All sheet articles of the invention exhibited a water contact angle of at most 30°.

Objects and advantages of this invention are further illustrated by the following examples, but the particular materials and amounts thereof recited in these examples, as well as other conditions and details, should not be construed to unduly limit this invention.

EXAMPLES

Example 1

Non-loaded Sorptive Polymer Paper: Kevlar

A blend of 40 g Kevlar (poly(p-phenyleneterephthalamide) (from Dupont)) pulp and 1.0 liter of deionized (DI) water was prepared in a blender for 20 seconds, then mixed with 12 liters of water in a Williams Sheet Mold (Williams Apparatus Co., Watertown, N.Y.). Water was removed through a 930.3 cm$^2$ porous screen having pores of approximately 0.14 mm (12-inch square 100 mesh porous screen) to give a wet sheet, which was pressed to remove additional water. The sheet was dried on a heated stage (Williams Apparatus Co., Watertown, N.Y.) at 93° C. for 20 minutes to give a dry sheet of 1.02 mm thickness, weighing 37.7 g, with a Gurley porosity of 15 seconds.

Calendering of the sheet at 260° C. through a 0.43 mm gap at a rate of 1.52 m/min gave a sheet of 0.46 mm thickness having a Gurley porosity of 56.8 seconds. Coulter porosity of the calendered sheet was 0.402–2.442 micrometers, with a mean free pore size of 0.668 micrometers.

Example 2

Particle-Loaded Sorptive Paper: Kevlar

A dispersion of 25 g particulate (see below) in 200 ml isopropyl alcohol was prepared in a laboratory blender with 15 g Kevlar pulp fibers in 1.0 liter of DI water for 20 seconds. A sheet was prepared from the aqueous blend as described in Example 1.

2a. In this example, the particulate material was silica to which was bonded organic aliphatic $C_{18}$ groups (henceforth "$C_{18}$"), available from Varian Sample Prep., Harbor City, Calif., having 8–15 micrometer diameter particle size.

2b. In this example, the particulate material was polymeric styrene-divinyl benzene resin of 5–10 micrometer diameter particle size, available from Sarasep, Santa Clara, Calif.

2c. Four samples were prepared in this example. The particulate material was Silicalite™ brand hydrophobic zeolite having an average diameter particle size of 5 micrometers, available from UOP, Tarrytown, N.Y.

Sheet materials as described in Examples 1, 2a, 2b, and 2c were tested for Gurley porosity, Coulter porosity, and Disperse Red I dye retention, as reported in Table I, below.

TABLE I(a)

| Example | Kevlar™ g | PE[1], g | PP[2], g | PAN[3], g | $C_{18}$ Silica, g | SDVB[4], g | Silicalite[5], g | Wt % Particle Additive |
|---|---|---|---|---|---|---|---|---|
| 1 | 40 | | | | | | | |
| 2a | 15 | | | | 25 | | | 58.1 |
| 2b | 15 | | | | | 25 | | 39.1 |
| 2c(i) | 15 | | | | | | 25 | 49.8 |
| 2c(ii) | 12 | | | | | | 12 | 30.6 |
| 2c(iii) | 15 | | | | | | 15 | 39.0 |
| 2c(iv) | 25 | | | | | | 25 | 42.3 |
| 4a | 10 | 15 | | | | | | |
| 4b | 10 | 17 | | | | | | |
| 5 | 10 | | 10 | | | | | |
| 6 | 14 | 10.2 | | | 20 | | | |
| Comp. 1 | | 30 | | | | | | 0 |
| Comp. 2 Empore™ $C_{18}$[6] | | | 20 | | | | | |
| 7a | 19.8 | | 0.2 | | | | 20 | 41.7 |
| 7b | 19 | | 1.0 | | | | 20 | 36.3 |
| 7c | 15 | | 5 | | | | 20 | 32.9 |
| 8a | | | | 30 | | | | |
| 8b | | | | 64 | | | 20 | 8.9 |
| 8c | | | | 64 | 20 | | | 23.5 |
| 8d | | 3.07 | | 55 | | | | |
| 8e Empore™ $C_{18}$[6] | 17.0 | | 30.2 | | | | | |
| 9a | | | 18 | | 12 | | | 41.7 |
| 9b | | | 37.6 | | 25 | | | 46.9 |
| 9c | | | 22.5 | | 20[7] | | | 33.3 |

TABLE I(b)

| Example | Sheet dry wt., gm | Sheet thickness, mm | Gurley No., sec. | Coulter Porosity, μm | Disperse Red I Dye Test Flow Rate, ml/min. | MeOH recovery, % | Atrazine Recovery, % |
|---|---|---|---|---|---|---|---|
| 1 | | 1.02 | 15 | 0.402–2.442 | 17.9 | 56 | |
| 2a | 33.7 | 0.81 | | 0.785–3.291 | 13.9 | 85 | |
| 2b | 23.2 | 0.71 | | 0.586–2.334 | 13.9 | 85 | |
| 2c(i) | 28.2 | 0.66 | | | 16.4 | 84.2 | |
| 2c(ii) | 17.3 | 0.46 | 7.9 | | | | |
| 2c(iii) | 24.6 | 0.64 | 11.1 | | | | |
| 2c(iv) | 43.3 | 0.94 | 23.6 | | | | |
| 4a | 18.5 | 0.43 | 4.0 | | | | |
| 4b | 19.9 | 0.66 | | | | | |
| 5 | 18.4 | 0.64 | 4.0 | | | | |
| 6 | | | 21.3 | | | | 99.4 |
| Comp. 1 | 17.6 | 0.71 | 3.9 | | | | 0.0 |
| Comp. 2 | | | 8.83 | | | | 0.0 |
| Empore ™ $C_{18}$[6] | | | 25.12 | | | | 98.7 |
| 7a | 34.3 | 0.89 | 10.7 | | | | |
| 7b | 31.4 | 0.91 | 8.5 | | | | |
| 7c | 29.8 | 0.91 | 6.6 | | | | |
| 8a | 12.5 | | 9.5 | | 11.5 | | |
| 8b | 29.3 | | | | 91.7 | | |
| 8c | 34.9 | | | | 94.2 | | |
| 8d | 18.9 | | 7.0 | | 23.8 | | |
| 8e | 19.5 | | 6.8 | | 11.2 | | |
| Empore ™ $C_{18}$[6] | | | | | 96.4 | | |
| 9a | 20.6 | 0.58 | 3.7 | | | | |
| 9b | 47.1 | 1.3 | 8.6 | | | | |
| 9c | 30.4 | 0.81 | 1.5 | | | | |

[1]Pulplus ™ polyethylene pulp, available from Dupont; wt. is gross wt. of 60% solids sheet (aq.)
[2]Pulpex ™ polypropylene pulp, available from Hercules, Wilmington, DE
[3]CFF 111-3 ™ polyacrylonitrile pulp, available from American Cyanamid Co.; wt. is gross wt. of 33% solids sheet (aq.)
[4]styrene divinyl benzene resin, 5–10 micron diameter, available from Sarasep, Santa Clara, CA
[5]Silicalite is a silica-rich zeolite, available from UOP
[6]Empore ™ $C_{18}$ is silica-$C_{18}$ particle loaded polytetrafluoroethylene web availabe from Varian Sample Prep., Harbor City, CA
[7]silica-$C_{18}$ average particle size was 40 micrometers Example 3
Non-Loaded Sorptive Sheet Material, Polyethylene:Acrylic Hydrophilic sheet materials were prepared from a total of 20 g of a mixture of Pulplus™ polyethylene (PE) pulp (E. I. Dupont & Co., Wilmington, Del.) and fiber pulp comprising a copolymer of more than 90% polyacrylonitrile (PAN) and less than 10% methyl methacrylate, available from American Cyanamid Co., Milton, Fla., by the procedure described in Example 1. Gurley Numbers for sheets of various composition are shown in Table II.

TABLE II

Papers of PAN Fiber/Polyethylene Formulations

| Example | PE, g | PAN, g | % PAN | Gurley No. |
|---|---|---|---|---|
| 3a | 0.2 | 19.8 | 99 | 7.8 |
| 3b | 0.6 | 19.4 | 97 | 6.7 |
| 3c | 1.8 | 18.2 | 91 | 7.0 |
| 3d | 3.0 | 17.0 | 85 | 11.0 |
| 3e | 10.0 | 10.0 | 50 | 6.8 |
| 3f | 15.0 | 5.0 | 25 | 6.0 |

Sheets of these blended fibers, were tested for their hydrophobic and adsorptive characteristics using thin-layer chromatography (TLC) methods, as described above. Results are shown in Table III.

It was found that sheets prepared only from PAN when contacted with polar solvents such as isopropanol-water solvent (200 to 1000 ml) exhibited an unacceptable degree of swelling. The resulting sheet materials on drying became wrinkled and irregular. Blends of PAN with PE pulps provided a dimensionally stable sheet material.

TABLE III

TLC Characteristics of Vinyl-Polyethylene Sheet Example 3B

| Dye | $R_f$[a] Cyclohexane | $R_f$ Acetonitrile | $R_f$ Water |
|---|---|---|---|
| Normal Phase Mixture 30-04 | | | |
| Fast Red 7B | 0.11 | 1.00 | 0 |
| Solvent Green 3 | — | 1.00 | 0 |
| Sudan II Peach | 0.62 | 1.00 | 0 |
| Sudan II Orange | — | 1.00 | 0 |
| Sudan Blue | 0.34 | 1.00 | 0 |
| Sudan Orange G | 0.79 | 1.00 | 0 |
| Reversed Phase Mixture 30-03 | | | |
| Fast Green FCF | 0 | 0 | 0 |
| Fluorescene | 0 | 0 | 0 |
| Naphthol Blue Black | 0 | 0.04 | 0.84 |
| Rhodamine | 0 | 0.27 | 0 |

[a]$R_f$ = retardation factor

Results presented in Table III indicate that the paper of Example 3b, comprising 97% acrylic pulp and 3% polyethylene, exhibited thin layer chromatographic separation properties even in the absence of sorptive filler particles.

Example 4

Non-Loaded Sorptive Sheet Material: Kevlar-Polyethylene Blend

4a. A hydrophilic sheet material was prepared in the general manner described in Example 1, from 15 g wet polyethylene pulp (Pulplus™, available from Dupont as a 60% solids wet sheet) blended with 10 gm Kevlar™ pulp in 1 liter of deionized (DI) water for 20 seconds. The dried sheet material was 0.43 mm thick and had a Gurley No. of 4 seconds. The sheet was calendered through a 0.23 mm gap at 110° C., at a rate of 1.52 m/min, to a final sheet thickness of 0.38 mm. Properties of this sheet are described in Table I, above.

4b. In a manner similar to Example 4a, a sheet was prepared from 10 g Kevlar pulp and 17.05 g wet polyethylene pulp, to give a sheet of approximately 1:1 dry weight ratio of Kevlar to polyethylene. Properties of the sheet are described in Table I, above.

Example 5

Non-Loaded Sorptive Sheet Material: Kevlar-Polypropylene Blend

A hydrophilic sheet material was prepared in the general manner described in Example 1, from 10 g polypropylene pulp (Pulpex™, available from Hercules) blended with 10 gm Kevlar™ pulp in 1 liter of deionized (DI) water for 20 seconds. The dried sheet material was 0.64 mm thick and had a Gurley No. of 4 seconds. The sheet was calendered through a 0.23 mm gap at 110° C., at a rate of 1.52 m/min, to a final sheet thickness of 0.41 mm. Properties of this sheet are described in Table I, above.

Example 6

Particle-Loaded Sheet Material: Kevlar-Polyethylene-$C_{18}$ Silica

A sheet material was prepared from an aqueous slurry of 14 g Kevlar™ fibers, 10.2 g 60%-solids polyethylene pulp (Pulplus™) and 20 g $C_{18}$-bonded silica particles in 1 liter of water, according to the method of Example 1. Properties of the sheet are shown in Table I, above.

Example 7

Particle-Loaded Sheet Material: Kevlar-Polypropylene-Silicalite™

Sheet material was prepared from Kevlar™ pulp, polypropylene pulp (Pulpex™, available from Hercules) and 20 g Silicalite particles (5 micrometer average particle size) which were suspended in 200 ml isopropyl alcohol, all of which was stirred in 1 liter of deionized water for 20 seconds, then made into a sheet according to the method of Example 1. Properties of sheets prepared by this method are shown in Table I, above.

Example 8

Sorptive Sheet Materials: Polyacrylonitrile (PAN)

Sheet materials comprising polyacrylonitrile fibers and additives thereto were prepared as follows. The polyacrylonitrile was obtained as "CFF 111-3™ Acrylic pulp" from American Cyanamid Co., Milton, Fla. and comprises 30% solids wet sheet material which is composed of a mixture of more than 90% polyacrylonitrile and less than 10% methyl methacrylate.

8a. 30 g (wet weight) CFF 111-3 was blended in 1.0 liter water for 20 seconds. A sheet was prepared according to the method of Example 1. The dried sheet weighed 12.5 g.

8b. Sheet material was prepared from a blend of 64 g CFF 111-3 and 20 g $C_{18}$-bonded silica particles which were suspended in 200 ml isopropyl alcohol, all of which was stirred in 1 liter of deionized water for 20 seconds, then made into a sheet according to the method of Example 1.

8c. Sheet material was prepared from a blend of 64 g CFF 111-3 and 20 g Silicalite particles (5 micrometer average particle size) which were suspended in 200 ml isopropyl alcohol, all of which was stirred in 1 liter of deionized water for 20 seconds, then made into a sheet according to the method of Example 1.

8d. Composite sheet material comprising polyacrylonitrile and polyethylene pulps was prepared by blending 3.0 g (wet weight) Pulplus™ polyethylene pulp and 55 g CFF 111-3 in 1 liter of water for 20 seconds, then forming a sheet according to the method of Example 1.

8e. In the manner of Example 10d, a sheet was prepared from 17 g Pulplus™ polyethylene pulp and 30.2 g CFF 111-3, so that the dry-weight ratio of fibers was approximately 1:1.

Properties of the polyacrylonitrile sheets are shown in Table I, above.

Example 9

Composite Sheet Material: Polyethylene-$C_{18}$ Silica (comparative).

Sheet material comprising polyethylene pulp and $C_{18}$-silica was prepared according to Example 1.

9a. A blend of 18 g Pulplus polyethylene pulp (Dupont) as a 60% solids wet sheet was blended with 12 g $C_{18}$-bonded silica in 1 liter of water for 20 seconds, after which a sheet of composite material was cast from the blend.

9b. A blend of 37.6 g Pulplus polyethylene pulp and 25 g $C_{18}$-bonded silica was made into a sheet material as described in Example 9a.

9c. A blend of 22.5 g Pulplus polyethylene pulp and 20 g $C_{18}$-bonded silica was made into a sheet material as described in Example 9a.

9d. A blend of 14.0 g Kevlar, 6.0 g PE pulp and 20.0 g $C_{18}$ bonded silica was made into a sheet material as described in Example 1.

The above four sheets were tested for oil-and grease-absorption ability. Results are shown in Table IV, below.

TABLE IV

| Trial Description | | Percent Recovery by Weight | | |
| --- | --- | --- | --- | --- |
| Example | Sample Type | 20 µl Sample | 200 µl Sample | 1000 µl Sample |
| 9a | PLO-a | 101 | 103 | 93 |
|  | CO-a | 99 | 90 | 96 |
|  | BG-a | 101 | 93 | 96 |
| 9b | PLO-b | 101 | 97 | 90 |
|  | CO-b | 82 | 94 | 88 |
|  | BG-b | 105 | 99 | 105 |
| 9c | PLO-c | 101 | 101 | 102 |
|  | CO-c | 103 | 93 | 96 |
|  | BG-c | 96 | 96 | 105 |
| 9d | PLO-d |  | 96 |  |
|  | CO-d |  | 92 |  |
|  | BG-d |  | 95 |  |

Example 10

SPE Properties of Chemically Altered Kevlar™

In order to determine the effect of chemical modification of Kevlar functional groups (aromatic, carbonyl, amide) on sorptive properties of sheet materials of the invention, pre-formed Kevlar sheets were modified as follows:

10a. Diazomethane

A 47 mm disk comprising a 1:1 blend of Kevlar and polyethylene pulps, as described in Example 4b, was immersed for 30 minutes in 5 ml of a diethyl ether solution saturated with diazomethane prepared from Diazald™ reagent, available from Aldrich Chemical Co. Gas evolution indicated that a reaction had taken place. The disk was removed from the reaction medium, washed with water followed by methanol, and dried in a vacuum oven at 30° C. and 66 cm Hg vacuum for 16 hours. The disk was tested for adsorption and recovery of Disperse Red I dye, as shown in Table V, below.

10b. Boron Trifluoride

A 47 mm disk (Example 4b) was immersed in 5 ml of a 12% solution of boron trifluoride in methanol (BF3—MeOH, available from Eastman Kodak Co., Rochester, N.Y.) for 30 minutes. An intensification of the normally pale-yellow color of the reagent was noted. The disk was removed, washed, and dried as above. Test results are shown in Table V, below.

10c. Lithium Aluminum Hydride

A 47 mm disk (Example 4b) was immersed in 5 ml of a saturated diethyl ether solution of lithium aluminum hydride (LiAlH$_4$, available from Aldrich Chemical Co., Milwaukee, Wis.) for 30 minutes. The disk was removed, washed, and dried as above. Test results are shown in Table V, below.

10d. Acetyl Chloride

A 47 mm disk (Example 1) was immersed in a solution of dimethyl formamide (DMF) containing 10 volume percent acetyl chloride (available from Pierce Chemical Co., Rockford, Ill.). After 30 minutes, the disk was removed, dried between tissue paper sheets, then dried for 16 hours in a vacuum oven at 50° C. at 66 cm Hg vacuum. Test results are shown in Table V, below.

The chemically altered materials of Example 10 were also tested for recovery of fluorescein dye, as follows: a 40 ppm dye solution was prepared by adding 2.0 ml of a fluorescein stock solution (20 ug/ml) to approximately 1 liter of reagent water. One liter of dye-containing water was passed through each of the disks shown in Table V, under 10 mm Hg vacuum. Prior to use, each disk was washed with acetone and methanol, then conditioned with methanol. After the water was processed, the retained dye was eluted with 3×5 ml methanol, and the combined eluants were collected, diluted volumetrically to 25.0 ml, and analyzed spectrophotometrically by UV-VIS at 230 nm. Results are shown in Table V, below.

TABLE V

| | Derivatized Kevlar Disks | | |
|---|---|---|---|
| Example | Dye Sample Flow Time (minutes/ liter) | Percent Recovery Disperse Red I | Percent Recovery Fluorescein |
| 4b (1:1 PE: Kevlar) | 5.1 | 77.9 | 56.0 |
| 10a | 6.1 | 70.9 | 13.0 |
| 10b | 5.1 | 64.4 | 40.3 |
| 10c | — | — | 57.1 |
| 1 (Kevlar only) | 7.1 | 75.3 | — |
| 10d | 4.7 | 15.4 | — |
| Empore ™-C$_{18}$ | 15.0 | 97.1 | 43.0 |

The results shown in Table V indicate that chemical modification of Kevlar functional groups significantly modifies sorptive and separation behavior of the disks. It was noted that Disperse Red I dye was tightly bound to the acetylated Kevlar (Example 12), as evidenced by the residual red coloration of the disk after methanol elution.

Example 11

Porosity and Adsorptive Properties Modification of Kevlar

A sheet article was prepared according to Example 1 using 20 g of Kevlar pulp (designated Example 11a). Portions of the sheet of Example 11a (designated Examples 11b–e) were dried, weighed, and measured with regard to diameter and thickness. Disks 11b and 11c were immersed in DMF and allowed to soak at room temperature for 30 minutes. The swollen wet disks were retrieved from the solution and then pressed gently between sheets of tissue paper to expell excess DMF solvent. The disks were then dried for 16 hours in a vacuum oven at 50° C. The disks were then reweighed and dimensions measured. Disks 11d and 11e were treated as above with the exception that the DMF solvent contained 10 weight percent acetyl chloride. All disks exposed to DMF and acetyl chloride gave a small weight gain of approximately 3 percent. Diameters increased only moderately from 47 to approximately 48 millimeters. Disk thickness however increased markedly from 0.69 mm to 0.96 mm.

Disks of Example 11b and 11d were analysed for porosity using the Coulter Porometer, as shown in Table VI. Disks of Example 11c and 11e were tested for sorptive properties with Disperse Red I dye, as described in Example 1. Results of the tests are shown in Table VI, below. It is readily apparent that the sorptive behavior of the acetyl chloride treated Kevlar (Example 11e) has been modified with respect to the Disperse Red I test. It also is apparent that swelling with DMF provides a means to increase the porosity of Kevlar sheet material. Disks remain swelled after drying and are less susceptible to further undesirable swelling and porosity changes during SPE procedures. Pre-swelling and subsequent drying of the pulp fibers prior to sheet formation will also provide more porous sheets.

TABLE VI

| Sample ID | Dye Sample Flow Time (minutes/ liter) | Percent Recovery | Min. PS (μm) | Max. PS (μm) | MFP (μm) |
|---|---|---|---|---|---|
| 11a | 6.3 | 80.1 | 0.887 | 3.479 | 1.262 |
| 11b | — | — | 1.353 | 7.294 | 1.761 |
| 11c | 5.4 | 75.8 | — | — | — |
| 11d | — | — | 1.316 | 6.919 | 1.687 |
| 11e | 5.1 | 29.8 | — | — | — |
| Empore ™ C$_{18}$ | >16 | 96.4 | — | — | — |

PS = pore size; MFP = mean free pore size

Example 12

Blends of Polyethylene and Kevlar Selected quantities of the Kevlar and polyethylene pulps shown in Table VII, below, were mixed in 1 liter of water for 20 seconds. Sheets were then prepared according to the method described in Example 1. Data in Table VII show that sheet porosity can be controlled by using blends of Kevlar and polyethylene pulps.

TABLE VII

| Example | polyethylene g | Kevlar g | Min. PS (μm) | Max. PS (μm) | MFP (μm) |
|---|---|---|---|---|---|
| 12a | 0.0 | 20.0 | 0.887 | 3.479 | 1.262 |
| 12b | 0.2 | 19.8 | 0.772 | 3.146 | 1.208 |
| 12c | 0.59 | 19.0 | 0.724 | 2.834 | 1.128 |
| 12d | 1.76 | 17.0 | 0.812 | 3.077 | 1.187 |
| 12e | 3.0 | 17.0 | 0.774 | 3.077 | 1.187 |
| 12f | 10.0 | 10.0 | 0.887 | 4.000 | 1.562 |
| 12g | 15.0 | 5.0 | 1.112 | 5.161 | 2.087 |
| 12h | 17.6 | 0 | 1.242 | 7.711 | 2.689 |

Example 13

Blends of Polypropylene, Kevlar, and Silicalite

A composite of polypropylene and Kevlar pulps containing, in each case, 20 g Silicalite™ in isopropanol were prepared and mixed in 1 liter of water for 20 seconds. Sheets were then prepared according to the method described in Example 1. Data in Table VIII, below, show that porosity of the Kevlar sheet material can be controlled by utilizing blends of Kevlar and polypropylene pulps in the Silicalite composite.

TABLE VIII

| Example | polypropylene (PP), g | Kevlar g | % PP in pulp | Min. PS (μm) | Max. PS (μm) | MFP (μm) |
|---|---|---|---|---|---|---|
| 13a | 0.2 | 19.8 | 1.0 | 0.474 | 2.065 | 0.699 |
| 13b | 1.0 | 19.0 | 5.0 | 0.512 | 2.336 | 0.812 |
| 13c | 5.0 | 15.0 | 25.0 | 0.662 | 2.832 | 1.112 |

Data in Examples 12 and 13 show that sheet porosity can be controlled both in the presence and in the absence of sorptive particulate such as Silicalite by controlling the ratio of Kevlar to polyolefin pulp.

Example 14

Solvent Adsorption

Sheet material comprising Kevlar and Silicalite particulate, described in Example 2c(iii), was tested for sorptive properties useful for SPE as follows: A 16 millimeter diameter disk weighing 0.0586 grams was cut from the sheet material and placed in the heated cavity of a common "head space analysis" device of a gas chromatograph used for residual solvent analysis (RSA) present in solid materials. This device incrementally samples and analyses the volatiles released upon heating the sample under controlled temperature and time conditions. It has the utility of determining the rate of desorption of volatiles from polymer films and other solids. The order of release of the component volatiles gives kinetic data for processing and analytical purposes. The disk was first heat-cleaned in the cavity for 25 minutes at 150° C. to remove any previously-accumulated volatile materials. It was then exposed to a mixture of volatile organic compounds (VOCs), namely benzene, toluene, and m-xylene.

The mixture of VOCs was prepared as follows: 0.005 ml benzene and 0.05 ml toluene were added to 5.0 ml m-xylene. A 0.001 ml portion of this mixture was injected onto the surface of the heat-cleaned disk which was then placed in the heated cavity and analyzed for volatile content using the RSA-gas chromatograph procedure. This constituted a standard to calibrate the instrument. A second 0.001 ml portion was added to a one liter glass container in which a heat cleaned disk had been placed. After 70 minutes, the disk was removed from the container and placed in the heated cavity for desorption and analysis of the vapors which had been adsorbed by the disk article. Table IX, below, shows flame ionization detector response data, expressed as peak area, for volatiles adsorbed by the disk and subsequently desorbed by the thermal conditions of the heated cavity. Six passes were used to establish desorption kinetics. Alternately, the net quantity of volatiles released via the thermal desorption steps could be accomplished in one step, using a technique known in the art as "cryogenic focusing" wherein the sum of the volatiles released by heating in the presence of a continuous purge of carrier gas are condensed on the head of a cooled chromatographic column. The column is subsequently heated, releasing a "plug" of accumulated volatiles to initiate the separation and measurement process.

TABLE IX

Thermal Desorption of Sorbed Volatile Organic Compounds

| | Benzene | | Toluene | | m-Xylene | |
|---|---|---|---|---|---|---|
| Pass | Standard | Vapor | Standard | Vapor | Standard | Vapor |
| 1 | 415 | 456 | 2,326 | 2,255 | 261,053 | 201,698 |
| 2 | 187 | 162 | 1,223 | 949 | 135,821 | 95,486 |
| 3 | 113 | 84 | 831 | 560 | 85,905 | 61,996 |
| 4 | 81 | 53 | 658 | 392 | 60,271 | 44,067 |
| 5 | 62 | — | 551 | 302 | 44,151 | 32,818 |
| 6 | 50 | 29 | 475 | 258 | 33,532 | 25,694 |

Kevlar is known to be stable at temperatures approaching 400° C. and Silicalite at temperatures of over 800° C. This example shows that Kevlar sheet material, in addition to acting as a means for entrapping sorptive particulate, can also function as a sorptive media. Silicalite is known for its ability to adsorb odors and volatile compounds. The combination of Kevlar and Silicalite provides a means of performing SPE on a wide range of organic compounds from fluids such as air and water. The thermal stability of this combination allows thermal desorption of sorbed compounds in contrast to solvent desorption as practiced in SPE prior art. Thermal stability of the polymeric material is extremely important so that polymer decomposition products do not interfere with the quantitative measurements of the organic compounds being desorbed.

Example 15

Adsorption of Phenolic Compounds

Kevlar as well as blends of SDVB and Silica-$C_{18}$ were also tested for their utility in SPE of phenolic compounds known to be priority pollutants. These compounds are listed in Table X, below, and recoveries are compared with particle loaded PTFE (commercial Empore™) and PE articles of prior art. Two samples of sheet materials were prepared using the procedure of Example 2b, except that PTFE (4 g of Teflon™ 30-B (Dupont, Wilmington, Del.) used as a 60% solids emulsion, and 8 g of Fluon™ AD057 (ICI, Exton, Pa.) used as a 25% solids emulsion, respectively, were added.

The test was conducted as follows: To 500 ml of deionized water was added aliquots of each of ten phenols such that the final concentration of each phenol in the water sample was 100 parts per billion. The pH of the mixture was adjusted to 2.0 with 1.0N aq HCl, after which a total of 10% by weight of solid sodium chloride was dissolved into the solution with stirring. The resultant sample was pulled through a 47-mm disk of the sheet material to be tested, as shown in Table X, below, under 25.4 cm (Hg) vacuum. The disks were eluted with 3×5 ml tetrahydrofuran (THF) and the eluants were combined, adjusted to 25 ml with additional THF, and analyzed for phenol content by HPLC, using UV detection. Results are presented in Table X, below.

was passed through the disk at a flow rate of 0.5 ml per minute. The eluant was collected for subsequent analysis of soluble gold content using a TJA-61E Inductively Coupled Plasma Spectrometer (ICP) (Applied Research Laboratories, Valencia, Calif.) at 242.7 nanometers wave length. A 10 ml aliquot of a sodium cyanide solution comprising 1 ug per ml

TABLE X

Percent Recoveries of Phenolics

| Compound | PTFE-SDVB[1] | Kevlar SDVB Ex. 2b | Kevlar SDVB[2] | Kevlar SDVB[3] | Kevlar Only Ex. 1 | Kevar $C_{18}$ Ex. 2a |
|---|---|---|---|---|---|---|
| phenol | 27.4 | 15.8 | 14.6 | 20.3 | 0.0 | 6.0 |
| 4-nitrophenol | 86.2 | 53.6 | 54.1 | 59.5 | 50.2 | 31.3 |
| 2,4-di-nitrophenol | 90.7 | 98.8 | 93.8 | 98.8 | 74.6 | 48.0 |
| 2-chlorophenol | 81.3 | 94.8 | 83.5 | 97.2 | 19.2 | 23.1 |
| 2-nitrophenol | 80.7 | 95.4 | 83.8 | 98.8 | 19.7 | 21.3 |
| 2,4-dimethylphenol | 83.0 | 99.0 | 88.7 | 100.3 | 17.2 | 52.6 |
| 4-chloro,3-methylphenol | 87.4 | 97.8 | 94.1 | 102.0 | 49.5 | 70.8 |
| 2,4-dichlorophenol | 88.4 | 97.5 | 94.1 | 97.2 | 88.7 | 81.4 |
| 2,4,6-trichlorophenol | 82.5 | 93.0 | 86.4 | 97.9 | 91.9 | 90.6 |
| pentachlorophenol | 111.1 | 106.4 | 94.6 | 102.3 | 102.0 | 98.4 |

[1]Available as EMPORE ™ Disk from Varian Sample Preparations, Inc., Harbor City, CA
[2]Contains Teflon 30-B fibrils
[3]Contains Fluon AD057 PTFE fibrils Data of Table X shows that Kevlar alone can be useful for SPE without SDVB, Silica-$C_{18}$, or other sorptive particles. The Table also shows that, in most cases, articles comprising Kevlar pulp and conventional sorptive particles such as SDVB gave better recovery of most of these phenols. Particle loading for the PTFE—SDVB material was 80 percent while particle loading for samples 2a, 2b, 6b and the PTFE-containing materials was typically less than 50 percent by weight.

Example 16

Solid Phase Reaction Using Gold-Coated Alumina Particles 20 g of Kevlar pulp were blended with 20 g of gold-coated alumina prepared from alumina particulate (Scientific Adsorbents Inc. Atlanta Ga.), in 1 liter of water for 20 seconds. The active particulate in this sheet article comprised 41.3 percent by weight of the total article weight after drying. Sheet thickness was 1.02 nun and the Gurley porosity was 2.7 seconds. The alumina had been previously coated with gold as follows: 20 g of alumina was mixed with 200 ml of methyl t-butyl ether (MTBE, available from Aldrich Chemical Co., Milwaukee, Wis.). This slurry was then mixed with 200 ml of MTBE containing 300 mg of $AuCl_3$ (available from Aldrich Chemical Co., Milwaukee, Wis.) with rapid stirring. One hundred ml of a solution comprising 0.07 parts of 37 percent formaldehyde in water, 0.21 parts of acetone, and 0.72 parts of MTBE was then added to reduce the gold chloride coated on the alumina. After 3 hours, the particulate was removed by filtration and washed with 2×300 ml ethanol. This was followed with a 300 ml wash with 1N NaOH followed with 3×300 ml water. The particulate was separated by filtration and dried at 90° C. in a vacuum oven for 18 hours.

The sheet material containing insoluble elemental gold was then evaluated for its reactivity with cyanide solutions under basic conditions in the presence of dissolved oxygen to form soluble $Au(CN)_2^-$ ion as shown in Equation 1:

$$Au^0 + 2CN^{-1} \rightarrow Au(CN)_2^{-1} \qquad \text{Equation 1.}$$

A 10 ml aliquot of an aqueous test solution adjusted to a pH of 11.0 with sodium hydroxide, used as a blank control, of cyanide ion per ml, adjusted to a pH of 11.0 with sodium hydroxide, was then flowed through the disk at a flow rate of 0.5 ml per minute and the eluant collected. The eluant was passed through the disk two additional times, and the final eluant was collected for analysis of gold as above.

Table XI lists amount of soluble gold cyanide complex obtained from cyanide reaction with insoluble elemental gold deposited on alumina in the eluants for the above samples. This was an oxidation/reduction reaction requiring the presence of dissolved oxygen in the cyanide solutions and in theory, 3.79 micrograms of ionic gold was formed per microgram of cyanide available for reaction.

TABLE XI

Solid Phase Reaction of Gold with Cyanide

| Example | Soluble Gold Detected μg/ml | Percent Conversion |
|---|---|---|
| blank control | <0.004 | 0 |
| 16 | 3.30 | 87.1 |

No soluble gold could be detected in the blank control which contained no cyanide.

Various modifications and alterations of this invention will become apparent to those skilled in the art without departing from the scope and spirit of this invention, and it should be understood that this invention is not to be unduly limited to the illustrative embodiments set forth herein.

We claim:

1. A solid phase extraction or reaction sheet article consisting essentially of in the range of 20 to less than 100 weight percent (based on the total weight of the sheet material) of at least one sorptive synthetic polymer pulp selected from the group consisting of 1) aramid pulp or derivatives thereof, 2) a blend of aramid pulp or a derivative thereof with polyolefin pulp or polyacrylonitrile pulp or fibrillated polytetrafluoroethylene, and 3) a blend of polyacrylonitrile pulp with polyolefin pulp, said sheet being prepared by a wet-laid process, said polymer pulp having enmeshed therein more than zero to 80 weight percent of at least one of sorptive and reactive particles having an average size in the range of 0.1 to 100 micrometers and in an amount sufficient to increase the sorptive or reactive capability of the sheet relative to the pulp without sorptive or reactive particles, said article being a unitary sheet having the property of isolating molecular species from fluids.

2. The article according to claim 1 wherein said polymer pulp is an aramid pulp.

3. The article according to claim 2 wherein said aramid polymer pulp is poly(p- or m-phenylenephthalamide).

4. The article according to claim 1 wherein said polymer pulp is polyacrylonitrile pulp with aramid pulp or polyolefin pulp.

5. The article according to claim 1 wherein said polymer pulp is one or more of said blends of polymer pulps.

6. The article according to claim 5, wherein said synthetic polymer pulp blend is aramid pulp or polyacrylonitrile pulp with polyolefin pulp.

7. The article according to claim 6 wherein said aramid pulp is poly(p- or m-phenylenephthalamide) and said olefin pulp is selected from the group consisting of polyethylene and polypropylene.

8. The article according to claim 6 having essentially uniform porosity.

9. The article according to claim 1 wherein said synthetic pulp is the blend of aramid pulp and fibrillated polytetrafluoroethylene.

10. The article according to claim 2 wherein said polymer pulp is an aramid pulp and said particulates are selected from the group consisting of alumina, silica, zirconia, and derivatives thereof.

11. The article according to claim 2 wherein said polymer pulp is an aramid pulp and said particulates are selected from the group consisting of polymeric organic resins, ion exchange particles, chelation particles, chiral particles, hydrophobic molecular sieves, and styrene divinylbenzene.

12. The article according to claim 1 wherein said polymer pulp is an aramid pulp and said particulates are gold coated particulates.

13. The article according to claim 2 wherein said aramid pulp is chemically modified poly(p- or m-phenylenephthalamide).

14. The article according to claim 1 wherein said polymer pulp is an aramid pulp and said particles are hydrophobic zeolites.

15. The article according to claim 13 wherein the ratio of poly(p-or m-phenylenephthalamide) to polyolefin pulp is in the range of 1 to 100 weight percent to 0 to 99 weight percent.

16. The article according to claim 1 which is radiation stable.

17. A method for making a solid phase extraction sheet for isolating molecular species from fluids comprising the steps of:

providing a mixture consisting essentially of in the range of 20 to less than 100 weight percent based on the total weight of the sheet material of at least one sorptive, hydrophilic, synthetic polymer pulp selected from the group consisting of 1) aramid pulp or derivatives thereof, 2) a blend of aramid pulp or a derivative thereof with polyolefin pulp or polyacrylonitrile pulp or fibrillated polytetrafluoroethylene, and 3) a blend of polyacrylonitrile pulp with polyolefin pulp, said polymer pulp having enmeshed therein in the range of more than zero to 80 weight percent of at least one of sorptive and reactive particles having an average size in the range of 0.1 to 100 micrometers, liquid and in an amount sufficient to increase the sorptive or reactive capability of the sheet relative to the pulp without sorptive or reactive particles, pouring said mixture through a porous screen to provide a unitary sheet material, removing up to 100% of the liquid from said sheet material to provide a sheet article having the property of isolating molecular species from fluids.

18. The method according to claim 17 further comprising the step of:

calendering said sheet material to press or fuse said sheet material.

19. The method according to claim 17 wherein said particulate have ion exchange, chelation, reactive, sorptive, or size exclusion capabilities.

20. The method according to claim 17 wherein said liquid is selected from the group consisting of water and water miscible organic solvent.

21. The method according to claim 17 wherein said polymer pulp is a blend of aramid pulp and polyolefin pulp.

22. The method according to claim 17 wherein said blend represents fibers of different diameters and lengths.

23. The method according to claim 17 wherein said particulates comprise more than one size range.

24. The method according to claim 17 wherein said sorptive particulate are selected from the group consisting of alumina, silica, and zirconia and derivatives thereof.

25. A solid phase extraction or reaction sheet article consisting essentially of in the range of 20 to less than 100 weight percent based on the total weight of the sheet article of a synthetic sorptive polymer pulp, said polymer pulp being a blend of polyolefin and aramid, said polymer pulp having enmeshed therein in the range of more than 0 to 80 weight percent of sorptive or reactive particles of $C_{18}$ silica, said amount being sufficient to increase the sorptive or reactive capability of the sheet relative to the pulp without sorptive or reactive particles, said article being a unitary sheet having the property of isolating molecules species from fluids and being prepared by a wet-laid process.

26. A solid phase extraction or reaction sheet article consisting essentially of in the range of 20 to less than 100 weight percent based on the total weight of the sheet article of at least one sorptive synthetic polymer pulp selected from the group consisting of 1) aramid pulp or derivatives thereof, 2) a blend of aramid pulp or a derivative thereof with polyolefin pulp or polyacrylonitrile pulp or fibrillated polytetrafluoroethylene, and 3) a blend of polyacrylonitrile pulp with polyolefin pulp, said sheet being prepared by a wet-laid process, said polymer pulp having enmeshed therein in the range of more than 0 to 80 weight percent of at least one of sorptive and reactive particles having an average size in the range of 0.1 to 100 micrometers and in an amount sufficient to increase the sorptive or reactive capability of the sheet relative to the pulp without sorptive or reactive particles, said article being a unitary sheet having the property of isolating molecular species from fluids and exhibiting radiolytic stability towards radioactive contaminants.

\* \* \* \* \*

UNITED STATES PATENT AND TRADEMARK OFFICE
CERTIFICATE OF CORRECTION

PATENT NO.: 5,688,370

DATED: November 18, 1997

INVENTOR(S): Donald F. Hagen, Simon S. Fung, and Paul E. Hansen

It is certified that error appears in the above-identified patent and that said Letters Patent is hereby corrected as shown below:

Col. 10, Line 60  Within Table I(a)  Example 8e
   move "17.0" from the Kevlar$^{TM}$ column to the PE$^1$ column
   move "30.2" from the PP$^2$ column to the PAN$^3$ column Col. 18, Line 65  "1.0N"  should read -- 1.0 N --

Col. 19, Line 44  "1.02 nun"  should read -- 1.02 mm --

Col. 19, Line 57  "1N"  should read -- 1 N --

Col. 21, Line 26  "pulp is the blend"  should read -- polymer pulp is the blend --

Signed and Sealed this

Fourteenth Day of July, 1998

Attest:

BRUCE LEHMAN

*Attesting Officer*      *Commissioner of Patents and Trademarks*